June 4, 1968        J. B. GODSHALK        3,387,200

BATTERY CHARGERS WITH REVERSE POLARITY INDICATOR

Original Filed Nov. 6, 1964

INVENTOR
James B. Godshalk

BY Arnold & Roylance
ATTORNEYS

United States Patent Office 3,387,200
Patented June 4, 1968

3,387,200
BATTERY CHARGERS WITH REVERSE POLARITY INDICATOR
James B. Godshalk, Yardley, Pa., assignor to Fox Products Company, Philadelphia, Pa., a corporation of Pennsylvania
Continuation of application Ser. No. 409,361, Nov. 6, 1964. This application Oct. 20, 1967, Ser. No. 676,979
1 Claim. (Cl. 320—48)

ABSTRACT OF THE DISCLOSURE

An ammeter, connected to a battery charging circuit, is provided with special calibrations which inform an operator when the polarity of the connection is incorrect. A resistor connected to a test probe issued to contact the battery terminal. A circuit breaker protects the apparatus from excessive current in case of reverse connection but allows the indication to appear first.

---

This application is a continuation of Ser. No. 409,361, filed Nov. 6, 1964, now abandoned.

This invention relates to storage battery chargers and, more particularly, to chargers equipped with means for indicating to the operator when a battery has been connected to the charger with reverse polarity, that is, with the battery potential aiding, rather than opposing, the charging potential.

The battery charger industry has long been faced with the need for protecting against reverse connection of the battery to be charged. In relatively large, high-rate automotive battery chargers, this need has recently become quite important, because of the necessity for protecting the diodes frequently employed in the modern alternator systems used in many vehicles, and a moderate expense is now tolerated for polarity protection systems in such chargers. Thus, in the larger automotive battery chargers, polarity protection systems of the type disclosed in my U.S. Patent 3,085,187 have been widely adopted. In less expensive battery chargers, such as the relatively low rate "overnight chargers," the price range for the charger does not allow use of relatively expensive components, and no truly satisfactory solution to the problem of providing polarity protection in such chargers has heretofore been provided.

It is accordingly a general object of this invention to devise polarity protection means which involves so little expense as to be suitable even for small, low-cost battery chargers.

Another object is to provide, in a storage battery charger, means for indicating to the operator when a battery has been connected to the charger with incorrect polarity, and to achieve this aim inexpensively, substantially without incorporating additional components in the charger.

Stated broadly, the invention is based on the concept of using as a polartiy indicator the ammeter which is ordinarily connected in the charging circuit, the dial of the meter being specially calibrated to yield a meaningful indication of the battery polarity when the battery is incorrectly connected and the charger not turned on.

In order that the manner in which the foregoing and other objects are attained in accordance with the invention can be understood in detail, one particularly advantageous embodiment thereof will be described with reference to the accompanying drawings, which form a part of this specification, and wherein.

Figure 1:
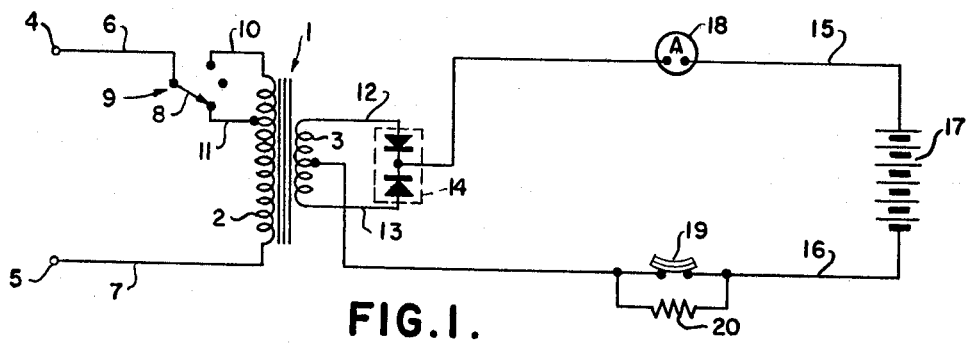
FIG. 1 is a schematic diagram of a battery charger in accordance with one embodiment of the invention.

Referring now to the drawings, and first to FIG. 1, the charger includes a transformer 1 having a primary winding 2 and a secondary winding 3. The primary winding is connected to AC supply terminals 4 and 5 via conductors 6 and 7, respectively. Conductor 6 is connected to the movable contact 8 of a manual switch 9 which includes three fixed contacts. One fixed contact of switch 9 is connected by conductor 10 to an end terminal of primary winding 2, for use in charging batteries of lower voltage such as 6-volt batteries. A second fixed contact of the switch is connected by conductor 11 to a tap on winding 2, for the charging of batteries of higher voltage, such as 12-volt batteries. A third fixed contact of the switch is "blank," so that the charger is not energized when the movable contact 8 is engaged with this third fixed contact.

The end terminals of secondary winding 3 are connected, via conductors 12 and 13, to a center-tapped rectifier 14. The center tap of the rectifier is connected to charging lead 15. A second charging lead 16 is connected to a center-tap on secondary winding 3. Leads 15 and 16 are provided with suitable connectors (not shown) to connect to the terminals of the storage battery 17 to be charged.

An ammeter 18 is connected in series in charging lead 15.

A circuit breaker 19, which can be of the bimetallic disc type, is connected in series in charging lead 17. A resistance 20 is connected in parallel with the circuit breaker 19, as shown.

Figure 2:
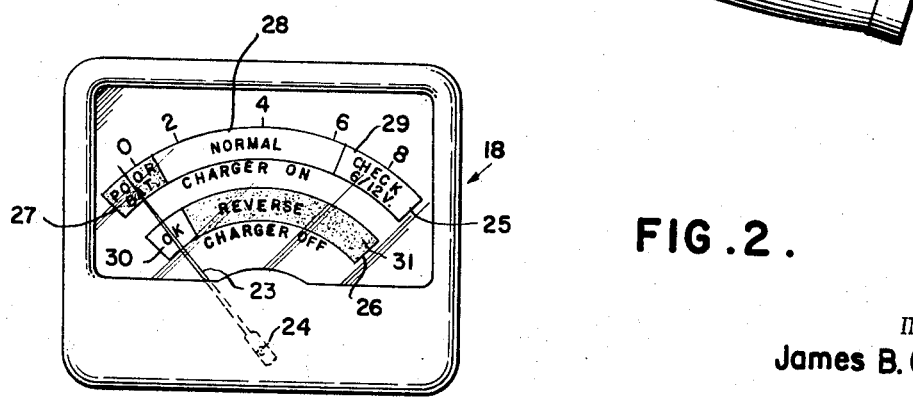
FIG. 2 is a front elevational view of an ammeter employed in the charger of FIG. 1.

Ammeter 18 is mounted on the outside of the charger casing, for view by the operator, and is especially calibrated, as shown in FIG. 2. The ammeter can be of any conventional construction and is preferably of the expanded scale type. The electromechanical details of the ammeter form no part of the invention and, accordingly, only the dial plate 21, housing 22, and pointer 23 are illustrated, the pointer being mounted to swing about axis 24. Dial plate 21 is provided with two arcuate scales or indicia sets 25 and 26 arranged one above the other and extending concentrically with respect to axis 24. As explained in greater detail hereinafter, scale 25 is intended to be read to determine battery condition when the battery 17 has been connected to the charger and switch 9 has been actuated to turn the charger on, and scale 26 is to be used to determine battery polarity when the battery 17 has been connected to the charger and the movable contact 8 of switch 9 engages the cooperating "blank" fixed contact so that the charger is not supplied with current.

Scale 25 includes, at its downscale end, a relatively short portion 27 which can be colored in red, for example, and provided with suitable indicia indicating "POOR BATTERY." When no current is supplied to the ammeter, pointer 23 occupies the "zero" position, as seen in FIG. 2. Scale portion 27 is located with its upper end slightly upscale from "zero" and extends downscale to terminate well downscale from "zero." Scale 25 also includes an intermediate portion 28, commencing at the upscale end of portion 27 and extending throughout most of the arcuate length of the scale. Portion 28 can be colored green, for example, and provided with suitable indicia indicating that the battery is "NORMAL." Scale 25 is completed by an upscale end portion 29, which can be colored red and provided with suitable indicia indicating that the operator should check to see that the position of movable contact 8 of switch 9 corresponds to the voltage rating of the battery 17 which has been connected to the charger. Suitable indicia, such as "CHARGER ON," is provided adjacent scale 25 to indicate to the operator that scale 25 is to be read when the charger is in operation.

Scale 26 includes, at its downscale end, a relatively short portion 30 which can be colored green, for example, and provided with suitable indicia, such as the notation "OK," indicating that the battery is connected with proper polarity for charging. The remainder of scale 26 consists of portion 31 which can be colored red, for example, and provided with suitable indicia, such as the word "REVERSE," to warn the operator that the battery has been connected to the charger with the wrong polarity for charging. A suitable notation, such as "CHARGER OFF," is provided adjacent scale 26 to indicate to the operator that scale 26 is to be read when the charger is not in operation.

Circuit breaker 19 is provided for overall protection of the charging circuit and, particularly, to avoid heavy currents which occur, for example, when the battery is connected to the charger with reverse polarity and the charger turned on, or a battery of fair voltage level is connected in reverse and the charger not yet energized.

Ammeter 18 is connected with proper polarity for upscale deflection of pointer 23 in response to DC charging current supplied by rectifier 14 during operation of the charger. Accordingly, the ammeter will also operate to provide an upscale deflection of pointer 23 when a battery is connected to the charger with the reverse or improper polarity for charging and the charger not turned on, since the discharge current from the battery will then flow via leads 15 and 16, secondary winding 3, and rectifier 14, in the same direction as charging current would flow, so long as circuit breaker 19 remains closed.

Portion 30 of scale 26 has its upscale end immediately above the zero position of pointer 23, and extends downscale from "zero." Hence, when the movable contact 8 of switch 9 engages the "blank" fixed contact, so that the charger is not energized, and battery 17 is connected in reverse, the discharge current from the battery causes pointer 23 to swing upscale, away from portion 30 of scale 26 and into portion 31, so that the operator is notified of the improper polarity of the battery, assuming circuit breaker 19 remains closed. If, on the other hand, the battery is properly connected for charging, and the charger not yet turned on, pointer 23 will remain in portion 30 of scale 26, indicating to the operator that the battery has been connected in proper polarity.

Were resistance 20 not provided in parallel with circuit breaker 19, the ammeter 18 would not be effective to warn of reverse connection of the battery in those cases where the battery has a predetermined, reasonable high initial charge level of, for example, 10% of full charge. This is because, when the charge level of the battery is at least 10% of full charge, the discharge current from the battery is sufficient to cause circuit breaker 19 to open almost immediately, so that the battery can not then discharge via ammeter 18 and it would appear to the operator that the battery was properly connected even though it was in fact connected in reverse. On the other hand, if the initial level of the battery is below 10% of full charge voltage, the action of circuit breaker 19 is decidedly slower, when the battery is connected in reverse, so that indicator 23 remains in portion 31 of scale 26 long enough for the operator to observe the indication of the reverse polarity connection.

The value of resistance 20 is accordingly chosen to provide a leakage current adequate for a substantial upscale deflection of the ammeter when the battery 17 has a charge equal to at least 10% of the full charge voltage for the battery, and the circuit breaker 19 is in open condition. Thus, for example, when the charging circuit is designed to supply a charging current of 6-20 amp. to 6-volt and 12-volt batteries, resistance 20 can be a 3-ohm, 10-50 watt resistor.

As seen in FIG. 2, the indicia provided on the dial plate clearly indicates to the operator that scale 26 is to be read when the charger is off, as when movable contact 8 engages the "blank" stationary contact, and that scale 25 is to be read when the charger is on, with contact 8 engaging either of the fixed contacts to which conductors 10 and 11 are connected. Accordingly, the ammeter 18 can serve in conventional fashion to indicate charging current, its function in this regard being in no way impeded by the polarity protection features of the invention.

This embodiment of the invention thus provides polarity protection at the cost of adding the resistance 20, plus the negligible cost of providing the additional scale 26 on the ammeter, while fully preserving the conventional usefulness of the ammeter, the circuit breaker and all other components of the charger.

Figure 3:
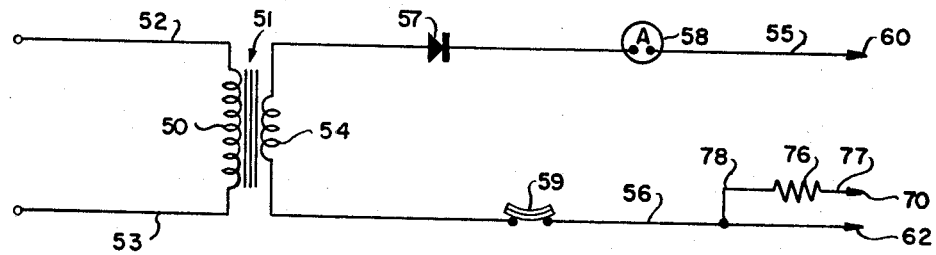
FIG. 3 is a schematic diagram of a battery charger in accordance with another embodiment of the invention.
Figure 4:
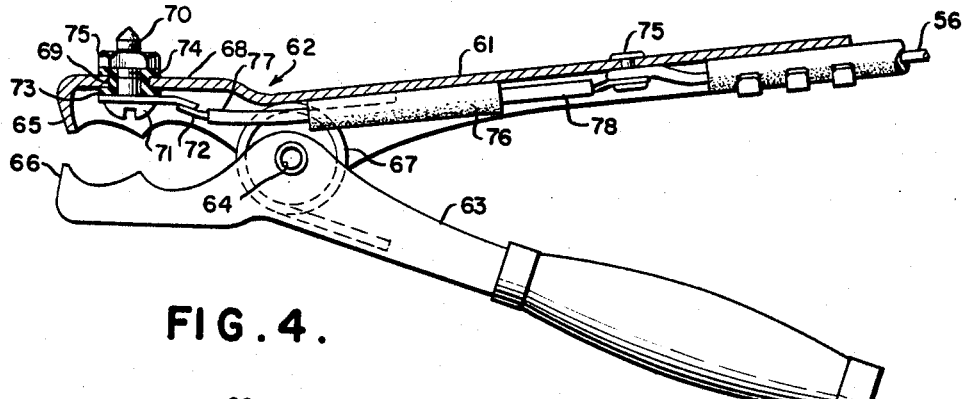
FIG. 4 is a view, partly in side elevation and partly in longitudinal cross section, of a connector clamp useful in the battery charger of FIG. 3.

FIGS. 3 and 4 illustrate a battery charger constructed in accordance with a second embodiment of the invention. In the circuit shown in FIG. 3, the primary winding 50 of transformer 51 is connectable to a suitable source of alternating current by leads 52 and 53. The terminals of the secondary winding 54 of the transformer are connected respectively to charging leads 55 and 56. A rectifier diode 57 and an ammeter 58 are connected in series in charging lead 55, the ammeter being calibrated in the same fashion illustrated in FIG. 2 and hereinbefore described. A conventional circuit breaker 59 is connected in lead 56.

Charging lead 55 is connected to a conventional connector device, such as a pivoted jaw clamp, for attachment to one terminal of the battery to be charged, this connector device being indicated diagrammatically at 60, FIG. 3. Charging lead 56 is connected to one jaw member 61 of a pivoted jaw connector clamp indicated generally at 62 and illustrated in FIG. 4.

The jaw members 61 and 63 of connector clamp 62 are of conventional configuration, being pivoted at 64, having terminal-engaging jaw portions 65 and 66, respectively, and being biased toward a closed position by a torsion spring 67. Members 61 and 63 are of brass or the like so that, when the jaw portions 65 and 66 are properly engaged with a battery terminal, the charging lead 56 is electrically connected to the terminal via the conductive body of member 61.

The main web 68 of jaw 65 is provided with an opening 69 through which extends an electrically conductive bolt 70. The head 71 of the bolt is disposed within jaw 65 and retains a connector lug 72 and an insulating washer 73. On the outside of the jaw, bolt 70 carries an insulating washer 74 and a nut 75. The exposed tip of bolt 70 is pointed so that the same can be brought into good electrical contact with a terminal of the battery to which the charger is to be connected.

The free end of charging lead 56 is secured directly to member 61, as by a conductive rivet 75. A resistor 76 is connected between bolt 70 and rivet 75 (thus charging lead 56) by insulated conductors 77 and 78.

Thus, the charging lead 56 can be connected to one terminal of the battery either via jaw member 61 of connector clamp 62 or via the series combination of bolt 70, resistance 76 and conductors 77 and 78, as will be clear from FIG. 3.

When the charger of FIGS. 3 and 4 is to be connected to a battery, the operator first attaches connector device 60 to one terminal of the battery and then, before energizing the charger, manipulates the connector clamp 62 in such manner as to bring bolt 70 in good electrical contact with the other terminal of the battery. At this time, the operator reads ammeter 58 in the same fashion hereinbefore described with reference to use of ammeter 18 in the embodiment of FIGS. 1 and 2. If the battery is connected with reverse polarity, improper for charging, the pointer of the ammeter will be deflected upscale and the "reverse" indicia can be observed by the operator as an indication of the improper battery polarity. If, on the other hand, the polarity of the battery is proper for charging, there will be no upscale deflection of the ammeter pointer and the operator will observe that the battery is "OK" for charging. The charger can then be energized, as by connecting leads 52 and 53 to the proper source of alternating current.

The value of resistor 76 is so chosen that, assuming the battery to have a predetermined relatively high voltage and that the connection of the battery is in reverse, improper for charging, the resistor will allow only enough current to flow in the charging circuit to adequately energize the ammeter 58. Such limited current flow is inadequate to operate the circuit breaker 59. In general, the value of resistance 76 can be the same as that chosen for resistance 20 in the embodiment of FIG. 1.

While particularly advantageous embodiment of the invention have been chosen for illustrative purposes, it will be apparent to those skilled in the art that various changes and modifications can be made therein without departing from the scope of the invention as defined in the appended claims.

What is claimed is:

1. In a battery charger of the type comprising an AC input circuit to be connected to an AC source, a DC output circuit including two charging leads each to be connected by the operator to a different terminal of the battery to be charged, each of the charging leads terminating in a connector which can be attached by the operator to a terminal of the battery to be charged, and a circuit breaker connected to interrupt current flow in the output circuit, the combination of an ammeter connected to respond to DC current flow in the output circuit, said ammeter comprising
a single movable indicator which is deflected in a predetermined direction upon occurrence of limited DC current flow in a charging direction in the output circuit,
a first scale with which said indicator cooperates when deflected in response to said limited current flow, said scale including indicia to inform the operator that said first scale is to be read while the charger is off and to further inform the operator whether the charging leads have been electrically connected to the battery correctly or incorrectly, and
a second scale with which said indicator cooperates, said second scale including indicia to inform the operator that said second scale is to be read while the charger is on, said second scale being calibrated in terms of charging current;

the charger further comprising
a conductive element forming part of a connector which can be brought by the operator into electrical contact with one terminal of the battery at a time when one of said connectors is attached to the other battery terminal; and
a resistive impedance connected to the output circuit to allow said limited current flow from the battery in the output circuit for energizing said ammeter when a battery of predetermined voltage level is connected to the charging leads with improper polarity for charging,
said resistive impedance being connected between said conductive element and through said DC output circuit to the one of the charging leads to which said other terminal is connected.

References Cited

UNITED STATES PATENTS

| | | | |
|---|---|---|---|
| 2,675,522 | 4/1954 | Godshalk | 320—48 X |
| 3,267,452 | 8/1966 | Wolf | 320—48 X |
| 2,246,163 | 6/1941 | Cheeseman | 320—48 |
| 2,721,993 | 10/1955 | Medlar | 320—48 X |
| 2,979,650 | 4/1961 | Godshalk et al. | 339—228 X |
| 3,160,805 | 12/1964 | Lawson | 320—39 |
| 3,185,921 | 5/1965 | Sumter | 324—29.5 |

JOHN F. COUCH, *Primary Examiner.*

WARREN E. RAY, *Examiner.*

S. WEINBERG, *Assistant Examiner.*